Patented Dec. 16, 1924.

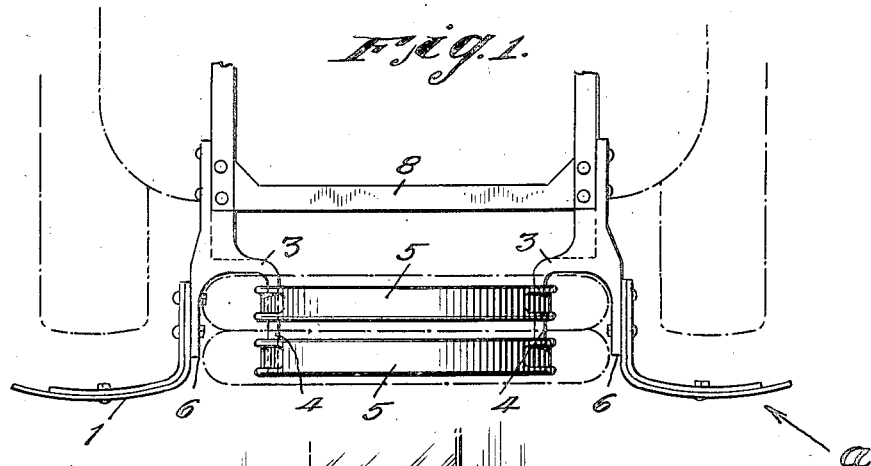
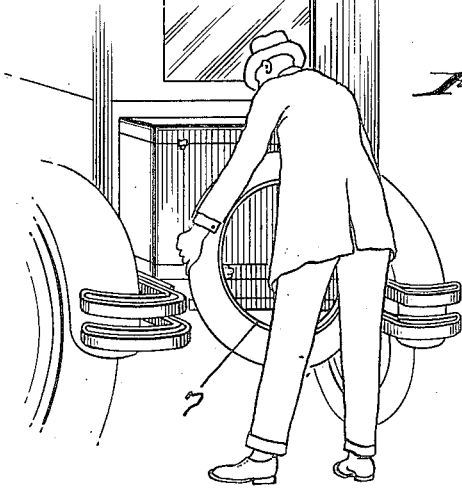
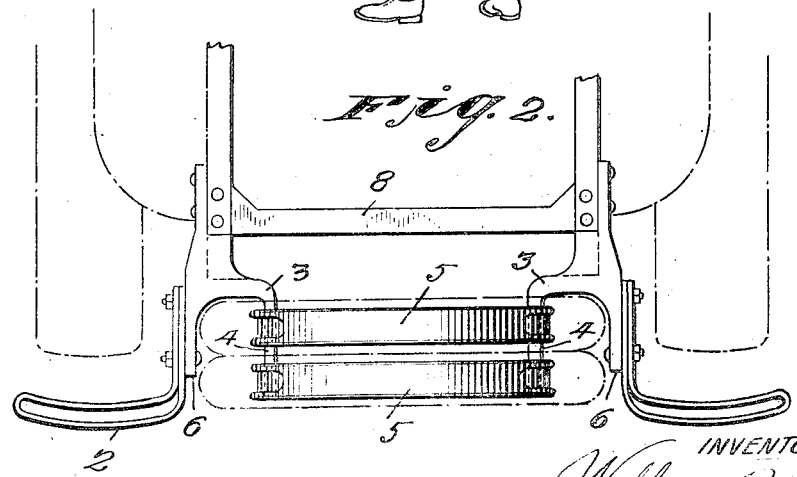

1,519,540

UNITED STATES PATENT OFFICE.

WILLIAM P. HAMMOND, OF SCARSDALE, NEW YORK.

REAR BUMPER FOR AUTOMOBILES.

Application filed July 17, 1924. Serial No. 726,430.

REISSUED

*To all whom it may concern:*

Be it known that I, WILLIAM P. HAMMOND, a citizen of the United States, residing in Scarsdale, county of Westchester, State of New York, have invented certain new and useful Improvements in Rear Bumpers for Automobiles, of which the following is a specification.

My present invention relates to rear bumpers for automobiles or the like and has for its object the provision of means for affording adequate protection to the rear fenders or wheel mudguards of the automobile, at the same time rendering the spare tire or tires usually carried upon the tire rack supported at the rear, readily accessible for demounting and remounting when occasion requires.

Conventional rear bumpers which span the width of the automobile interfere with the removal and replacement of the spare tires from or on the carrier, it being necessary to lift the spare tire over the bumper bar.

Tires of large size are weighty and this weight is increased by the weight of the demounting rims upon which they are mounted. Thus it is to be seen that it is desirable to obviate the necessity of lifting this weight vertically to clear the bumper when the spare tire is being mounted upon or demounted from the tire carrier.

This application is a continuation in part of my copending application Serial No. 446,385 filed February 19, 1921 which is a continuation of my earlier application Serial No. 163,828 filed April 23, 1917, now Patent No. 1,376,807 granted May 3, 1921. In said patent and copenaing application, I have disclosed means for accomplishing this desideratum in certain of the bumper constructions therein illustrated and described. In said Letters Patent I have provided a sectional bumper which spans the width of the automobile, the central section of which is arranged to be moved from its normal protecting position so as to permit of such spare tire being removed from its carrier in a direction in line with the longitudinal axis of the automobile and without a vertical lift thereof to clear any obstruction, the tire being permitted to drop by its own weight to the ground whereupon it can be rolled to any desired position.

In another structure illustrated in said Letters Patent the bumper comprises a pair of fender or wheel mudguard protecting members so positioned with respect to the spare tire supporting means that such spare tire can be very readily removed in a similar manner and direction as that just described. In this instance the bumper members protecting the fenders or wheel mudguards are spaced from each other sufficiently to accommodate the spare tire which may be mounted upon a tire carrier or support, located between them and it is this structure which embodies the principle of my present invention.

The object therefore of my present invention is to provide spaced apart fender or wheel mudguard bumper members bearing such relation to the chassis of the automobile and its associated parts as well as the spare tire carrying means that an unobstructed space will be provided for the reception of the spare tire or tires so that accessibility and convenience of handling the same may be accomplished.

A further object of my invention is to arrange the pair of bumper members so as to occupy a position in a plane substantially common with the rear side of the spare tire that is supported upon the bracket so that the tire in a way forms a barrier across the intervening space and serves to protect the central portion of the rear of the automobile. A further advantage flows from this construction in that the members may be brought into closer proximity to the fenders or wheel mudguards, thus lessening the overall length of the machine permitting parking with greater facility where space is limited and ease as well in the housing of the machine in a garage where there is a limited amount of space.

A further object of my invention is to mount the pair of spaced apart fender or wheel mudguard protecting members in association with each other by means connecting them in a unitary structure which in turn is fastened to the automobile chassis or rear of the machine. Thus the bumper members are arranged to occupy the proper desired relative position when the unit of which they form a part is connected to the automobile, thus assuring their proper location with respect to the fender or wheel mudguards, both as to rearward and lateral extension. By thus connecting the fender protecting or bumper members into a unitary structure by means of a cross bar or connection between the bumper members, the strength and rigidity of the separate bumper members, and the means for connecting them to the vehicle, to resist impacts without permanent distortion is greatly enhanced because the blow on one bumper member is not borne solely by this bumper member and its vehicle connecting means but is also transmitted thru the cross-connecting member or members to the other bumper member and its vehicle connecting means thus permitting the bumpers and vehicle connecting means on the opposite sides of the vehicle to mutually assist in supporting and strengthening the other.

A still further object of my invention is to form a connecting member which associates the pair of fender bumper members in a unitary structure in such a way that a spare tire support may be provided. This embodiment of my invention makes it possible to manufacture and sell as a unitary structure, a combination spare tire holder and rear fender guards which may be readily attached as a unit to the automobile.

Another object of the invention is to combine a pair of rear fender bumper members with the spare tire and carrier in such a way as to protect the rear fenders and permit free accessibility of the tire and at the same time protect the tire and the supporting arms of the tire carrier from oblique or lateral thrusts, to prevent damage to the tire or breaking of the carrier by a sidewise or oblique blow.

To the accomplishment of these as well as other objects which will appear from the following specification I have illustrated in the accompanying drawings an embodiment of the principles of my invention.

Figure 1 illustrates in top plan a fragmentary portion of the automobile chassis, the body, and fenders or wheel mudguards being shown in dotted outline and a pair of connected spaced apart bumper members being supported in operative position upon said chassis, means being shown whereby the spare tire or tires may occupy the space between the members.

Figure 2 illustrates a similar view of a modification.

Figure 3 is illustrative of certain principles of the invention as applied to the rear of an automobile, whereby convenience of handling the spare tire is shown.

Referring to Figure 1 of the drawings the fender or wheel mudguard protecting bumper members are indicated by the numeral 1 and may be formed of flexible material such as strap steel, and may be of laminated construction or consist of a pair of single thickness or be in the form of a loop such as shown at 2 in Figure 2. In any case it is preferable that these guard members be so shaped as to extend substantially across the width of the fenders of the automobile and be spaced sufficiently to the rear thereof to be engaged by the impacting body before the fender is reached so as to properly function.

These fender guards being resilient, the impact receiving portion gives so as to provide a yielding resisting agency to applied force. The fender guard members 1 are connected in spaced relation by any suitable means. I have chosen to illustrate the connecting means in the form of a spare tire support, in order that a closer association of the parts may be accomplished than is possible where the bumper or fender guards are mounted on cars provided with spare tire supporting brackets or means of conventional character, there being nothing of a standardized construction in vogue at the present time.

In the illustrated embodiment the supporting connection between the fender guards consists of the bracket support 3 formed with an arm extension 4 rigidly connected to a tire receiving ring like supporting member 5, upon which the demountable rim 7 (see Figure 3) of the spare tire cooperates in supporting the latter. The brackets 3 are provided with extensions 6 spaced from the arms 4 so as to provide for the accommodation of spare tire or tires when mounted thereupon. To the extensions 6 are fastened the fender guards or bumper members 1.

The brackets 3 are directly connected to the automobile chassis 8 so that the entire structure may be substantially and rigidly supported in operative relation to the rear of the automobile.

The ring like tire supporting members 5 and arms 4 which rigidly connect the bumper members 1 act as a cross connector or brace between the two bumpers to transmit a portion of the force of an impact on one bumper to the opposite bumper and to the means 3 for connecting this bumper to the chassis, thus strengthening the bumpers and equalizing the strains thereon, at the same time permitting protection to the spare tire and ready access to the tire for removing or placing it on the carrier.

The bumper or protecting members 1 project laterally across the width of the fenders or wheel mudguards so as to afford adequate protection to the same. The spacing of the fender guards or bumper members in fixed relationship to each other so as to afford protection to the fenders or wheel mudguards and so as to accommodate the spare tires in the space thus formed between them accomplishes the several advantages alluded to and thus makes possible the adequate protection of the fenders which are most apt to be damaged and which are as a matter of fact most frequently damaged since they occupy such a vulnerable position. The bumper members 1 and the spare tire on the carrier may occupy a position in substantially the same plane, or the tire may be spaced inwardly slightly from the rear plan of the bumpers, in either case the bumper members and the tire form substantially a complete barrier or bumper across the rear of the automobile. At the same time the bumper members 1 are located so as to adequately protect the tire and the arms 4 or other supports for the tire carrier from oblique or lateral thrusts such as may be represented by the arrow A.

It will be apparent that with my invention the spare tires can be readily and expeditiously handled with a minimum amount of exertion on the part of the motorist. The fender guards by reason of their location with respect to the fenders minimizes the overall longitudinal dimension of the vehicle, thus facilitating the parking thereof, and making possible the housing of the vehicle in a smaller size garage than would be possible if the automobile were equipped with a rear bumper of the conventional kind.

It is obvious that the particular combined tire bracket and bumper support illustrated can readily be dispensed with and different forms of connecting members associated with the fender or bumper members so that the unitary structure, thus formed could be attached to automobiles which have previously been equipped with spare tire supporting means, and that the bumper connector and tire carrier need not be of integral construction.

Furthermore it is obvious that the fender guards or bumper members in some instances can be used to advantage without the connecting member in which case, the fender guards will be independently mounted upon the automobile in such a position as to afford the protection they are intended to give.

When used and mounted separately in the manner last alluded to they will be so positioned that they bear spaced relation to each other the intervening space being occupied by the tire bracket and the spare tire. Thus the mounting and demounting of the spare tire is accomplished with facility and expedition and in accordance with the intention and principles of my invention.

I do not wish to be limited to any specific form of fender guard or bumper member as it is well within the scope of my invention to impart any particular configuration thereto as will meet the structural parts of the machine best. I wish to reserve unto myself that range of equivalency commensurate with the prior state of the art and the terms of the appended claims which are intended to define the principles of my invention.

I claim:

1. A bumper structure for automobiles comprising a pair of guard members, means connecting same in spaced relation whereby to protect the fenders of said automobile and to provide for the accommodation of a spare tire between them, means to support a spare tire in substantially the plane of said guard members, and means for attaching the bumper structure to the chassis of the automobile.

2. In combination with the rear end of an automobile provided with the usual chassis frame mud guards and spare tire holder, a pair of bumper members each provided with a resilient impact portion extending outwardly adjacent the rear fender to protect the same, and means in addition to said chassis frame supporting the bumper members in spaced apart operative position at the sides only of the spare tire holder.

3. A unitary rear bumper for automobiles having flexible end portions and being formed to accommodate a spare tire therebetween, said end portions beginning at a point adjacent the tire receiving portion and extending outwardly adjacent the edge of the fender whereby to protect the same.

4. In combination with the rear end of an automobile, provided with fenders or mudguards, a bumper structure, a tire carrier supported from the rear of the automobile, said bumper structure having spaced flexible end portions extending outwardly from each side of said tire carrier, the impact portions of which are substantially in the same plane with the tire when mounted upon the carrier so that the tire and bumper members form a one plane impact receiving surface at the rear of the automobile.

5. A combined tire support and bumper for the rear end of automobiles provided with mudguards, comprising a spare tire support, yieldable fender guards sufficiently spaced one from the other and cooperatively connected with the tire support to provide an unobstructed central portion whereby it is possible to mount and dismount the spare tire from the support without raising the tire above the top of the fender guards.

6. In combination with a chassis of an automobile, a pair of fender guards supported adjacent the side bars of the chassis and extending outwardly and laterally thereof, whereby to protect the mudguards and a member extending across the width of the chassis and connecting the pair of fender guards, in proper operative position substantially as described, said member being spaced inwardly from the rear plane of the fender guards to permit a spare tire to be carried between the fender guards with the rear of the tire in substantially the same plane as the rear plane of the fender guards.

7. The combination with the tire carrier at the rear of an automobile, of a bumper member at each side thereof, extending outwardly behind the rear fenders in substantially the rearward plane of the tire carrier to protect the fenders and tire carrier.

8. The combination with the tire-carrier at the rear of an automobile of a bumper member at each side thereof extending outwardly in substantially the rearward plane of the tire carrier beyond the rear fenders, said bumper members being spaced from the tire carrier sufficient distance so as not to interfere with the mounting or removal of a spare tire on said carrier.

9. A rear bumper for automobiles, comprising a pair of flexible or resilient bumper members, means for securing said members to the rear of an automobile chassis so that the bumper members extend outward and laterally adjacent the rear fenders and being adapted to protect the same, and a cross member connecting said bumper members so as to reinforce each other, said cross connecting member being located in a plane substantially nearer to the car frame than the operating faces of the bumper members.

10. A rear bumper for automobiles, comprising a pair of flexible or resilient bumper members, means for securing said members to the rear of an automobile chassis so that the bumper members extend outward laterally adjacent the rear fenders and are adapted to protect the same, and a cross member connected to the bumper members outside the vertical plane of the bumper members and at a point farther from the chassis than said chassis securing means.

11. A rear bumper for automobiles, comprising a pair of flexible or resilient bumper members, means for securing said members to the rear of an automobile chassis so that the bumper members extend outward laterally adjacent the rear fenders and are adapted to protect the same and a cross connecting means connected to the bumper members at a point outwardly from the vehicle chassis securing means but at a point inward from the rear plane of said bumper members, a sufficient distance to permit a tire carrier to be disposed between the bumper members with the rear of the tire carrier and bumper members in substantially the same plane.

12. A rear bumper for automobiles comprising a pair of bumper members adapted to extend out from a point adjacent the spare tire to the outer edge of the fenders to protect the same, unitary means to connect said bumper members and spaced inward from the rear plane thereof, and means to connect said bumpers and bumper connecting means to the chassis of the automobile.

13. A combined spare tire support and protection member for the rear of automobiles, comprising means for supporting a spare tire, impact receiving members extending laterally on each side of the tire supporting means and lying in a plane substantially parallel with the rear of the automobile, means for spacing said impact members from the tire supporting means a distance sufficient to receive a spare tire therebetween, said means also connecting said tire supporting means and impact members and being located forwardly from the rear plane of the impact members a distance sufficient to permit the tire to be carried with the rear thereof in substantially the same plane as the impact members and means for connecting the impact members and tire carrier to the chassis of the automobile.

In testimony whereof I have affixed my signature to this specification.

WILLIAM P. HAMMOND.